United States Patent
Keohane et al.

(10) Patent No.: US 7,356,566 B2
(45) Date of Patent: Apr. 8, 2008

(54) SELECTIVE MIRRORED SITE ACCESSES FROM A COMMUNICATION

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/682,422

(22) Filed: Oct. 9, 2003

(65) Prior Publication Data

US 2005/0091401 A1    Apr. 28, 2005

(51) Int. Cl.
G06F 15/16    (2006.01)
G06F 15/173    (2006.01)

(52) U.S. Cl. ............... 709/206; 709/224; 709/229
(58) Field of Classification Search ......... 709/238, 709/240, 206, 224, 229
See application file for complete search history.

(56) References Cited

U.S. PATENT DOCUMENTS

| 6,178,460 | B1 | 1/2001 | Maddalozzo, Jr. et al. | 709/239 |
|---|---|---|---|---|
| 6,192,396 | B1 * | 2/2001 | Kohler | 709/206 |
| 6,247,045 | B1 * | 6/2001 | Shaw et al. | 709/207 |
| 6,286,006 | B1 | 9/2001 | Bharat et al. | 707/100 |
| 6,332,141 | B2 | 12/2001 | Gonzalez et al. | 707/10 |
| 6,421,726 | B1 | 7/2002 | Kenner et al. | 709/225 |
| 6,487,555 | B1 * | 11/2002 | Bharat et al. | 707/10 |
| 6,622,174 | B1 * | 9/2003 | Ukita et al. | 709/246 |
| 6,636,965 | B1 * | 10/2003 | Beyda et al. | 713/152 |
| 2002/0059384 | A1 | 5/2002 | Kaars | 709/206 |
| 2002/0095687 | A1 | 7/2002 | Shintani et al. | 725/112 |
| 2002/0105545 | A1 | 8/2002 | Carter et al. | 345/752 |
| 2002/0138626 | A1 | 9/2002 | Smith et al. | 709/227 |
| 2002/0194280 | A1 * | 12/2002 | Altavilla et al. | 709/206 |
| 2003/0001846 | A1 | 1/2003 | Davis et al. | 345/474 |
| 2003/0023752 | A1 | 1/2003 | Williamson et al. | 709/245 |
| 2003/0061378 | A1 | 3/2003 | Mazzitelli | 709/238 |
| 2003/0110295 | A1 | 6/2003 | Suzuki et al. | 709/245 |
| 2004/0019644 | A1 * | 1/2004 | Fellenstein et al. | 709/206 |

OTHER PUBLICATIONS

"Ping—a searchNetworking definition", Jan. 1, 2002, TechTarget, http://web.archive.org/web/20021201093405/searchnetworking.techtarget.com/sDefinition/0,,sid7_gci214297,00.html.*

* cited by examiner

Primary Examiner—Jason Cardone
Assistant Examiner—Brian J Gillis
(74) Attorney, Agent, or Firm—Matthew W. Baca; Amy J. Pattillo (57) ABSTRACT

A method, system, and program for selective mirrored site access from a communication are provided. When composing a communication, multiple mirrored site addresses are embedded with a target site address. The sender may request to enter the mirrored site addresses or a browser supplies the mirrored site addresses. At each client system receiving the communication, selections of site addresses accessible for each intended recipient are detected. Thus, each client system, when outputting the communication, displays the selection of mirrored site address accessible to the intended recipient accessing that client system.

14 Claims, 8 Drawing Sheets

Sender E-mail 400

Tom Jones
12/16/03 04:35PM
--------------------------------
406 — To: Developers, John Anderson
408 — Subject: Download new version 5.4x You can download new version 5.4x at 404 — w3.ibm.com/newversion54x/os2  402

*Fig. 4A*

Sender E-mail 410

Tom Jones
12/16/03 04:35PM
--------------------------------
To: Developers, John Anderson
Subject: Download new version 5.4x You can download new version 5.4x at

404 — w3.ibm.com/newversion54x/os2

414 — w3.ibm.com/newversion54x/linux
www.ibm.com/newversion54x

SELECTIVE MIRRORED SITE ACCESSES FROM A COMMUNICATION

BACKGROUND OF THE INVENTION

1. Technical Field

The present invention relates in general to improved network systems and in particular to a method for selectively sending and filtering links to mirrored sites in a communication. Still more particularly, the present invention relates to selectively displaying a selection of mirrored site address from among multiple mirrored site addresses embedded within a communication depending on which mirrored sites a particular recipient of the communication can access.

2. Description of the Related Art

The development of computerized information resources, such as interconnection of computer networks, allows users of data processing systems to link with servers within a network to access vast amounts of electronic information. Multiple types of computer networks have been developed that provide different types of security and access and operate at different speeds. For example, the internet, also referred to as an "internetwork", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite of protocols. The Internet is readily accessible through a multitude of service providers. An intranet is another network designed like the Internet for information processing, but in contrast to the Internet, an intranet is typically accessible only to those within a company or organization providing the intranet.

Servers connected within a network provide the information resources. The locations of servers within a network are identified by a network address, such as a Universal Resource Locator (URL). The URL specifies the protocol to be used in accessing the resource, the name of the server on which the resource resides, and optionally, the path to a resource.

Data available from one network location is often duplicated at or "mirrored" at other network locations. These duplicate locations are commonly referred to as "mirrored sites." Often, if mirrored sites exist, the mirrored sites are displayed on an initial page retrieved from a first network location. A user may then select from among the multiple mirrored sites to download a file or application.

Mirrored sites are beneficial because the same or similar information is provided at multiple locations, allowing a user to attempt to choose the fastest location. For example, the Linux operating system can be downloaded from multiple mirrored sites with different access speeds at each site. Additionally, the client system may include a software function (such as the function described in U.S. Pat. No. 6,178,460) that monitors the performance of the mirrored locations in order to optimize the retrieval of information from the mirrored sites.

In addition to being a source of information, networks typically enable communications between clients. Multiple types of communication mediums are available across a network, such as electronic mail (e-mail), instant messaging, chatting and others. E-mail allows a person to quickly and easily send textual messages and other information, such as a textual link to a network location accessible to a recipient. Typically, e-mail client software allows the recipient of an e-mail to click on a selectable link displayed within an e-mail to initiate opening a browser window and attempt access of the network location.

One common use of e-mail is sending selectable site links to alert recipients to new downloadable files and other resources. Further, a user may send an e-mail with multiple selectable mirrored site links to the same resource. Currently, where an e-mail is sent that includes selectable mirrored site links, all recipients receive the same list, whether the mirrored sites are accessible to all recipients or not. For example, some mirrored sites may be accessible within an intranet while others are accessible within the Internet, but not all recipients have access to the intranet. Such a listing can be confusing for recipients and time consuming to find those mirrored sites accessible to each recipient, particularly as the number of listed mirrored sites increases.

Therefore, it would be advantageous to have an improved method, system, and program for selectively enabling access to only those mirrored sites available to the recipient of a communication containing mirrored site addresses.

SUMMARY OF THE INVENTION

In view of the foregoing, it is therefore an object of the present invention to provide improved network systems.

It is another object of the present invention to provide a method, system and program for selectively sending and filtering links to mirrored sites in a communication.

It is yet another object of the present invention to provide a method, system and program for selectively displaying a selection of mirrored site address from among multiple mirrored site addresses embedded within a communication depending on which mirrored sites a particular recipient of the communication may access.

According to one aspect of the present invention, a sender of a communication opens a target site address within a browser window. The sender then requests to send a link to the target site address to at least one recipient. By invoking the request to send a link to at least one recipient, a communication window is opened by the browser. Additionally, the browser determines whether there are any mirrored site addresses associated with the current target site address. The browser may search a network for mirrored site addresses or the mirrored site addresses may be embedded with the source code for the web site accessed from the current target site address. Any mirrored site addresses are embedded with the communication sent to a recipient designated by the sender such that when the communication is received the embedded site addresses are read by the e-mail client or browser at the recipient system and displayed with the communication if the mirrored site addresses are accessible to the recipient.

Alternatively, according to another aspect of the present invention, a sender of a communication opens a communication window and enters a target site address. The sender then requests to enter mirrored site addresses. The mirrored site addresses entered by the sender are embedded with the target site address such that when the communication is received the embedded site addresses are read by the e-mail client or browser at the recipient system and displayed with the communication if the mirrored site addresses are accessible to the recipient.

According to yet another aspect of the present invention, a communication is received at a client system with multiple mirrored site addresses. The communication is received by a particular recipient from among at least one intended recipient. A selection of accessible site addresses for the particular recipient is detected from among the multiple mirrored site addresses. The e-mail client receiving the communication or the browser invoked from the communication may detect the selection of accessible site addresses for the particular recipient. From among the multiple mirrored site addresses, only the selection of accessible site addresses for the particular recipient is displayed. A particular attributed may be associated with the display of the selection of accessible mirrored site addresses.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
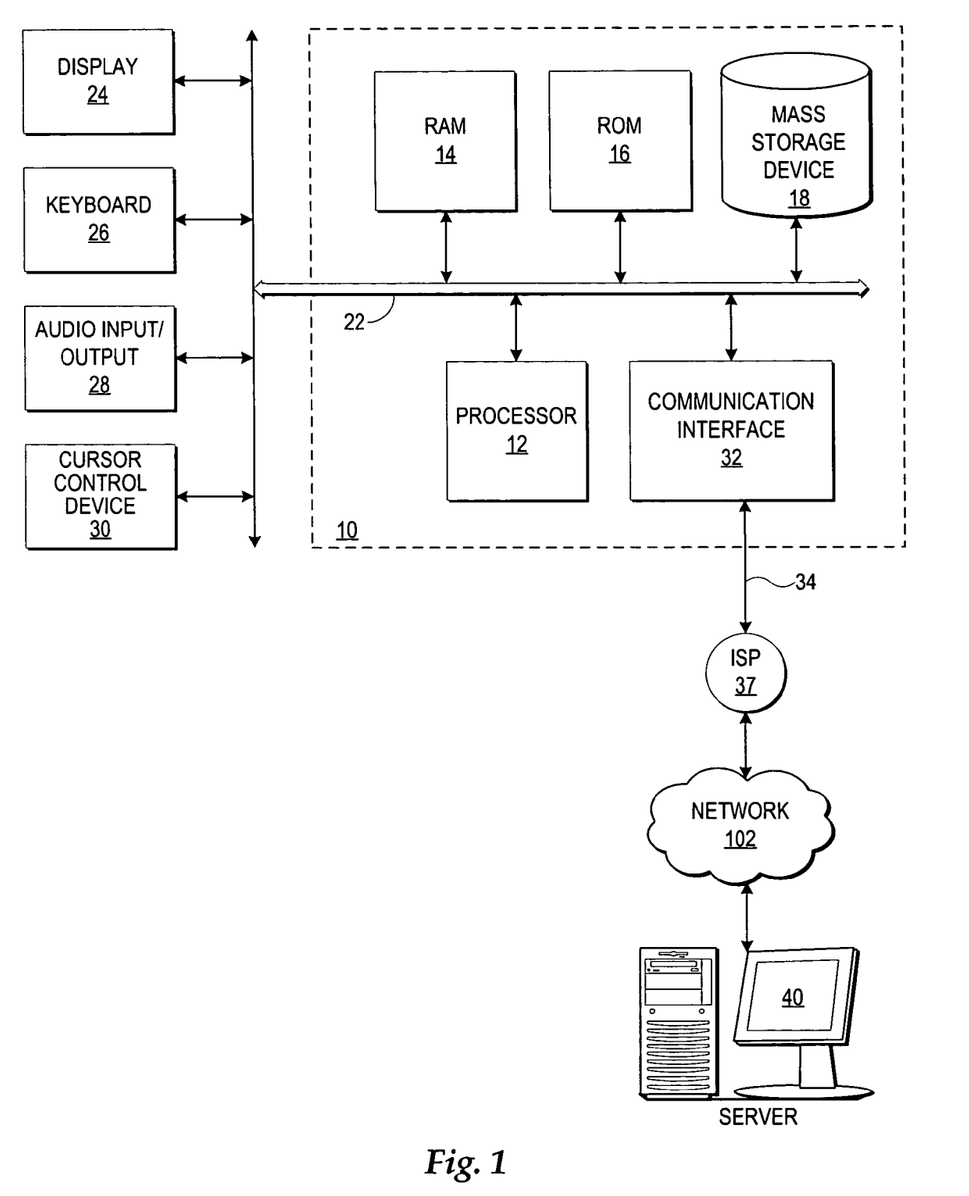
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and adapters and controlled within computer system 10 by multiple bus controllers. When implemented as a server system, computer system 10 typically includes multiple processors designed to improve network servicing power.

Processor 12 may be a general-purpose processor such as IBM's PowerPC™ processor that, during normal operation, processes data under the control of operating system and application software accessible from a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 7, 8, 9, and 10, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18 which as depicted is an internal component of computer system 10, but will be understood to also be provided by an external device. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 40 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through network 102. Network 102 may refer to the worldwide collection of networks and gateways that use a particular protocol, such as Transmission Control Protocol (TCP) and Internet Protocol (IP), to communicate with one another. ISP 37 and network 102 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

When implemented as a server system, computer system 10 typically includes multiple communication interfaces accessible via multiple peripheral component interconnect (PCI) bus bridges connected to an input/output controller. In this manner, computer system 10 allows connections to multiple network computers.

Further, multiple peripheral components may be added to computer system 10, connected to multiple controllers, adapters, and expansion slots coupled to one of the multiple levels of bus 22. For example, an audio input/output 28 is connectively enabled on bus 22 for controlling audio input through a microphone or other sound or lip motion capturing device and for controlling audio output through a speaker or other audio projection device. A display 24 is also connectively enabled on bus 22 for providing visual, tactile or other graphical representation formats. A keyboard 26 and cursor control device 30, such as a mouse, trackball, or cursor direction keys, are connectively enabled on bus 22 as interfaces for user inputs to computer system 10. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
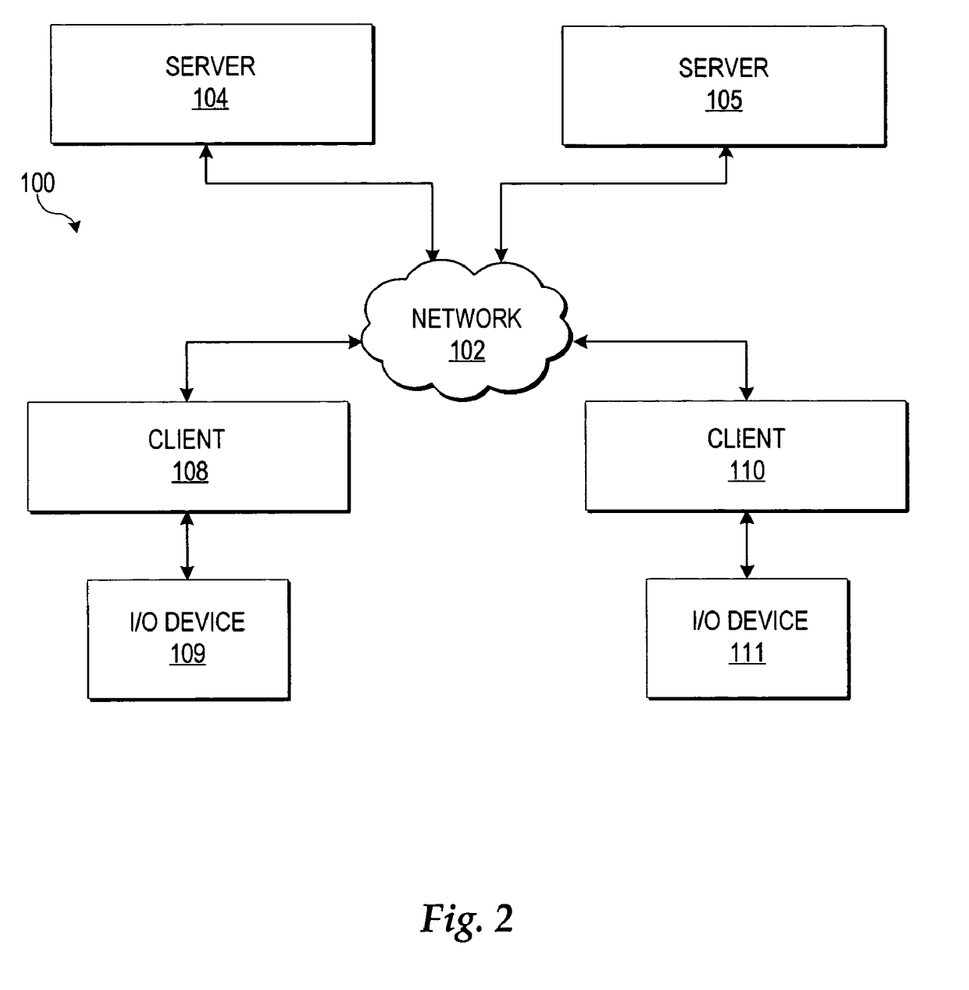
FIG. 2 is a block diagram depicting a distributed network system for facilitating communications and access to mirrored sites.

With reference now to FIG. 2, a block diagram depicts a distributed network system for facilitating communications and access to mirrored sites. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections such as wire or fiber optics cables, temporary connections made through telephone connections and wireless transmission connections.

In the depicted example, servers 104 and 105 are connected to network 102. In addition, clients 108 and 110 are connected to network 102 and provide a user interface through input/output (I/O) devices 109 and 111. Clients 108 and 110 may be, for example, personal computers or network computers. For purposes of this application, a network computer is any computer coupled to a network, which receives a program or other application from another computer coupled to the network.

The client/server environment of distributed data processing system 100 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client systems 108 and 110 and render Web documents (pages) served by a web server, such as servers 104 and 105. Additionally, each of client systems 108 and 110 and servers 104 and 105 may function as both a "client" and a "server" and may be implemented utilizing a computer system such as computer system 10 of FIG. 1. Further, while the present invention is described with emphasis upon servers 104 and 105 enabling downloads or communications, the present invention may also be performed by client systems 108 and 110 engaged in peer-to-peer network communications and downloading via network 102.

The Web may refer to the total set of interlinked hypertext documents residing on servers all around the world. Network 102, such as the Internet, provides an infrastructure for transmitting these hypertext documents between client systems 108 and 110 and servers 104 and 105. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 104 and pathname by which a file can be accessed, and then transmitted from the particular web page server to an end user utilizing a protocol such as Hypertext Transfer Protocol (HTTP) or file-transfer protocol (FTP). Web pages may further include text, graphic images, movie files, and sounds, as well as Java applets and other small embedded software programs that execute when the user activates them by clicking on a link. In particular, multiple web pages may be linked together to form a web site. The web site is typically accessed through an organizational front web page that provides a directory to searching the rest of the web pages connected to the web site. While network 102 is described with reference to the Internet, network 102 may also operate within an intranet or other available networks.

A single server, such as server 104 may serve as the host for one or more mirrored sites, each identified by a specific site address, hereinafter termed a mirrored site address. Alternatively, multiple servers such as both server 104 and server 105 may serve as host for multiple mirrored sites.

Additionally, servers 104 and 105 may server as communication hosts for transferring communications between clients 108 and 110. For example, servers 104 and 105 may serve as communication hosts for e-mail communication between clients 108 and 110. For purposes of illustration, the examples following are implemented using e-mail communications, however, other types communications may be used to implement the present invention including, but not limited to, instant messaging, text messaging, chatting, video conferencing and any other form of communication made available via network 102.

Figure 3:
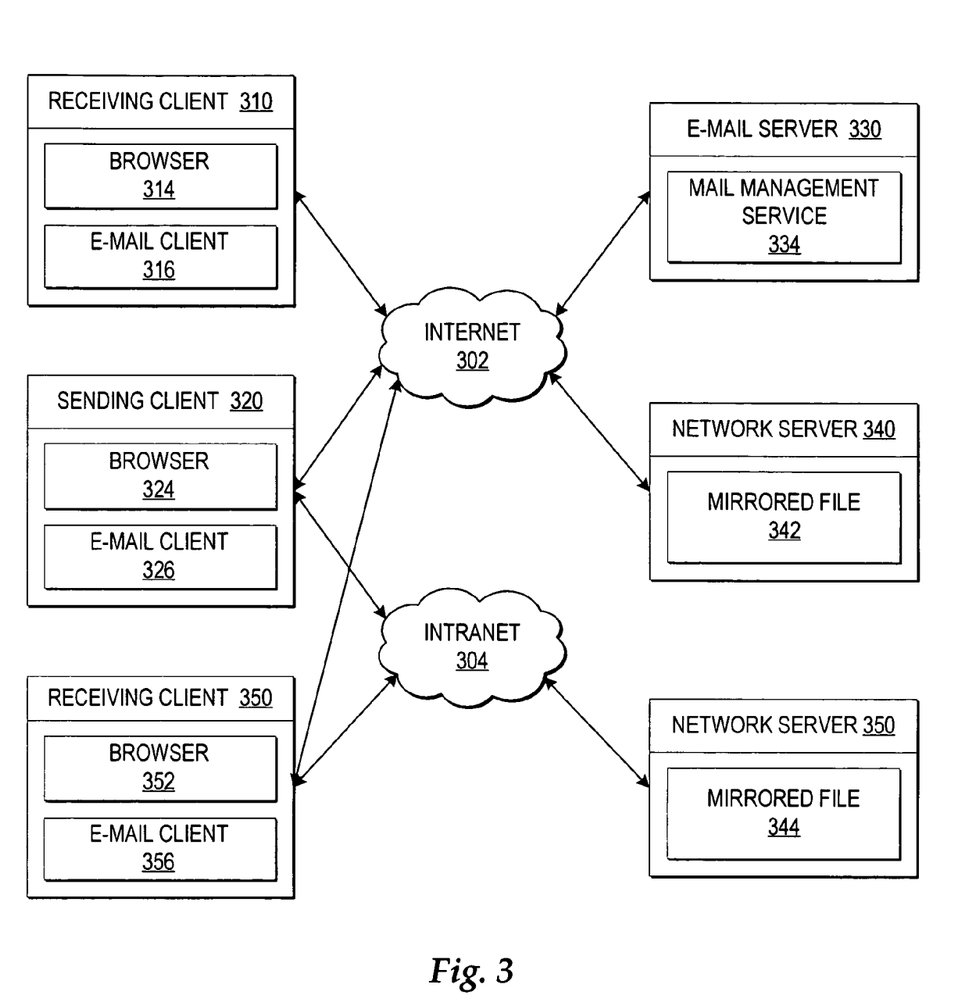
FIG. 3 is a block diagram depicting an example of a networking environment in which accessible mirrored sites are displayed according to recipient in accordance with the method, system, and program of the present invention.

Referring now to FIG. 3, a block diagram depicts an example of a networking environment in which accessible mirrored sites are displayed according to recipient in accordance with the method, system, and program of the present invention. As illustrated, a sender client 320 is communicatively connected to multiple networks, including Internet 302 and intranet 304.

A sender of a communication, such as an e-mail, initiates the communication from sending client 320. An e-mail client 326 residing on sending client 320 manages the sender's e-mail communications. E-mail client 326 processes and stores messages created by and received by the sender. E-mail client 326 also includes a mail reader which provides the GUI that is used to display e-mail communications. E-mail client 326 may be implemented by using currently available mail systems, such as Lotus™ Notes, which is available from Lotus Development Corporation. It will be appreciated by one skilled in the art that for other types of communications, such as instant messaging or video messaging, other types of communication controllers may be implemented within sending client 320.

A browser 324 within sending client 320 establishes the connections with Internet 302 and intranet 304 and presents information to the sender via a GUI. Browser 324 may support the functionality provided by HTTP. Further, browser 324 preferably supports other remote network services, such as an FTP service, which facilitates the transfer and sharing of files across networks, such as the Internet. Additionally, browser 324 may incorporate e-mail client 326 and support other protocols.

An e-mail communication via Internet 302 is typically managed by an e-mail server, such as e-mail server 330. E-mail server 330 includes a mail management service 334 which includes a mail daemon and storage media. In one embodiment, e-mail server 330 receives an e-mail sent by sending client 320 and stores the e-mail until requested by receiving client 310. Receiving client 310 includes an e-mail client 316 for requesting e-mail from e-mail server 330 and managing the display and storage of the e-mail received at receiving client 310.

In one example, the sender composes an e-mail including the URL of a mirrored site accessible via Internet 302, such as a location served by network server 340. In addition, the e-mail includes the site address of a mirrored site accessible via an intranet 304, such as the location served by network server 350. Further, in the example, the sender addresses the e-mail to reach receiving client 310 and receiving client 350. Receiving client 350 has network access to both intranet 304 and Internet 302. Receiving client 310, has network access to Internet 302, but not intranet 304.

Preferably, when an e-mail containing mirrored site addresses is received by an e-mail client, such as e-mail clients 316 and 356, the e-mail client may selectively display within the e-mail only those mirrored site addresses to which the recipient has access. E-mail client 316 may determine which site addresses the recipient can access by sending a Packet Internet Groper (PING) to each of the site addresses or using another method of testing whether a network connection can be established between receiving client 310 and the server hosting the site address. Thus, in the example, e-mail client 316 would enable the display of the site address accessible via Internet 302 at receiving client 310 and e-mail client 356 would enable the display of the site addresses accessible via Internet 302 and intranet 304 at receiving client 350. Additionally, the e-mail client preferably displays mirrored site addresses within an e-mail with a specific attribute, such as a particular color that is distinguishable from normal site addresses. In particular, inaccessible mirrored site addresses may be displayed with another specific attribute and the link to the inaccessible mirrored site addresses may be deactivated.

Alternatively, the e-mail client may display all mirrored site addresses as selectable links or objects within an e-mail and allow the recipient to select one of the mirrored site addresses. In response to such a selection, the browser, such as browsers 314 and 352, detects the mirrored URLs within the body of the e-mail or collects mirrored site addresses by searching the network for sites that provide the same or similar files. The browser then determines which mirrored sites the user may access. The browser may return a selectable list of mirrored sites or automatically begin communications with the first accessible mirrored site.

In addition to only displaying those mirrored sites to which a recipient has access, the mirrored site addresses may be filtered for other characteristics. For example, mirrored site addresses may be filtered so that recipients would only view a site address for a mirrored site that is password protected if the recipient possesses a password to access the mirrored site. In another example, mirrored site addresses may be filtered so that recipients would only view site address for those mirrored sites that have downloadable data compatible with the operating system running at the recipient client.

Network servers 340 and 350 include mirrored files 342 and 352. By accessing the web pages from the site addresses associated with network servers 340 and 350, a user is preferably enabled to elect to download files 342 and 352. It will be understood that network servers 340 and 350 may include multiple types of resources, including files, applications, web pages, processing services, and any other function provided by a server via a network that may be mirrored at another location. Further, it will be understood that mirrored resources need not be exactly the same resource, but may be resources with similar characteristics.

Figure 4A:
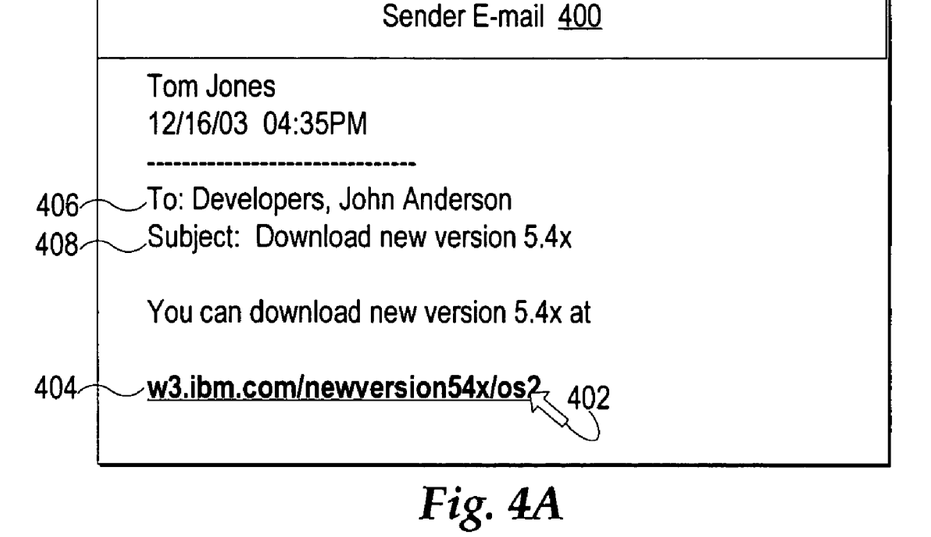
FIGS. 4A and 4B are illustrative examples of a sender composed e-mail with embedded mirrored site addresses depicted in accordance with the method, system, and program of the present invention
Figure 4B:
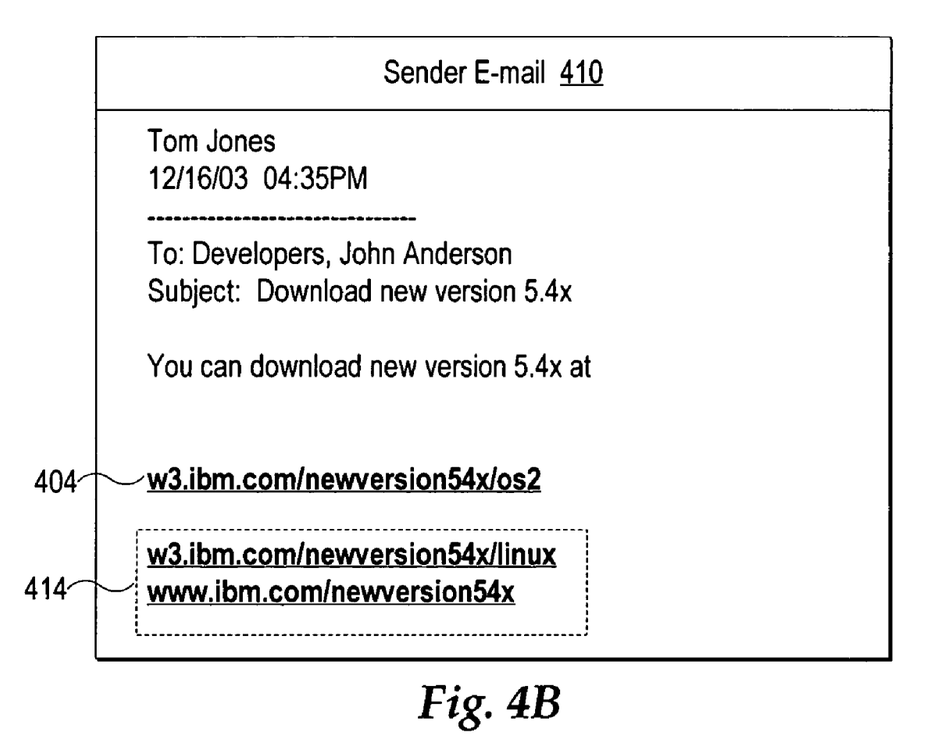

With reference now to FIGS. 4A and 4B, illustrative examples of a sender composed e-mail with embedded mirrored site addresses are depicted in accordance with the method, system, and program of the present invention. In this example, sender "Tom Jones" composes sender e-mail 400 to an e-mail group called "developers" and to John Anderson, as illustrated at reference numeral 406. The subject of sender e-mail 400 is "download new version 5.4x" as depicted at reference numeral 408. The message informs the recipients that they may download the new version of software at a primary site address "w3.ibm.com/newversion54x/os2", as illustrated at reference numeral 404. This target site address is located within intranet 304 as illustrated in FIG. 3.

The target site address illustrated at reference numeral 404 provides downloadable software that is also available at mirrored sites. According to one embodiment, the sender may preferably enter the site addresses for the mirrored sites in association with the target site address illustrated at reference numeral 404. To perform this function, in the example, when the sender moves a cursor 402 over the target site address and right-clicks, the sender may elect to enter the site addresses for mirrored sites. Alternatively, other input by the sender may initiate the entry of site addresses for mirrored sites.

In the example, the site addresses illustrated at reference numeral 414 in FIG. 4B are the site addresses for mirrored sites entered by the sender in association with the target site address illustrated at reference numeral 404. For purposes of the example, "w3.ibm.com/newversion54x/linux" is another site address accessible via intranet 304 that provides the download for a different operating system. In comparison, "www.ibm.com/newversion54x" is accessible via Internet 302.

The site addresses for mirrored sites illustrated at reference numeral 414 are preferably embedded in the e-mail text in association with the target site address. A special flag may be set or tag used to identify embedded mirrored site addresses. When sender e-mail 410 is displayed, the site addresses for mirrored sites may be hidden or visible as selectable links.

Figure 5A:
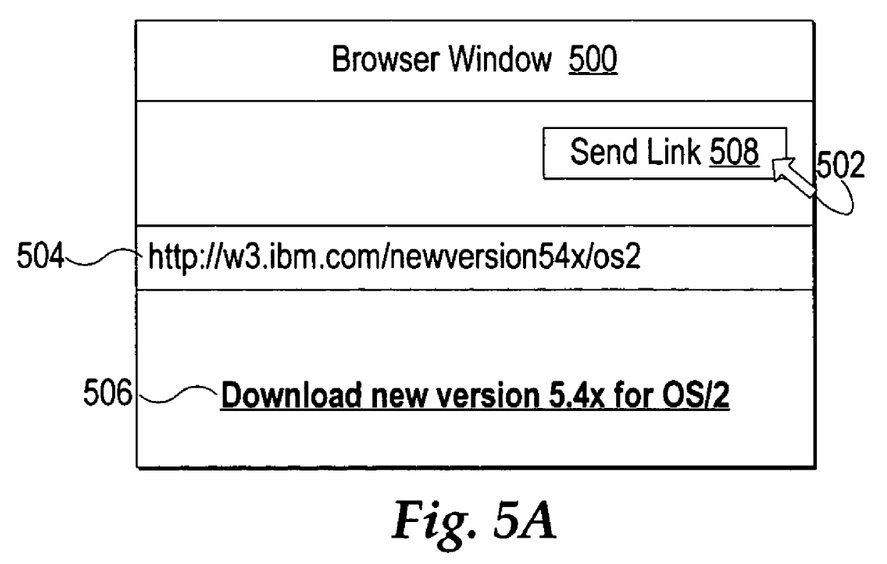
FIGS. 5A and 5B are illustrative examples of a sender composed e-mail with embedded mirrored site addresses initiated by the web browser depicted in accordance with the method, system, and program of the present invention.
Figure 5B:
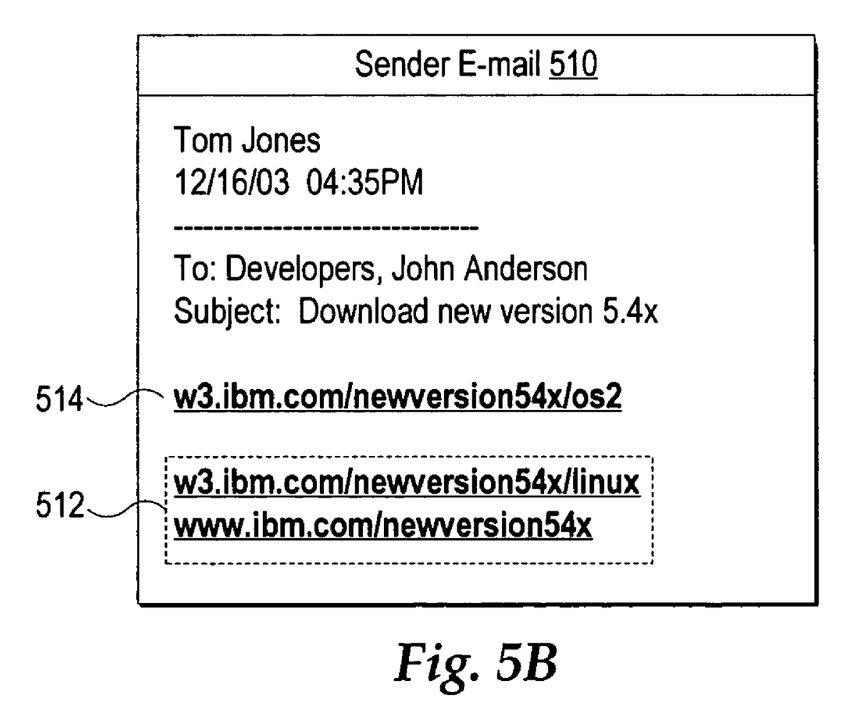

Referring now to FIGS. 5A and 5B, illustrative examples of a sender composed e-mail with embedded mirrored site addresses initiated by the web browser are depicted in accordance with the method, system, and program of the present invention. The content of the examples depicted in FIGS. 5A and 5B is the same as that illustrated in FIGS. 4A and 4B, but the methods of embedding mirrored site addresses are distinguishable between the sets of figures.

In this example, the sender is viewing a browser window 500 displaying the web site accessible at the site address "w3.ibm.com/newversion54x/os2" as illustrated at reference numeral 504. At the web site, a user may initiate a download by selecting selectable text 506. For example, a user may select selectable text 506 by positioning cursor 502 over the text and clicking. It will be understood by one skilled in the art that other method for initiating a download from a web page are available. Further, it will be understood that resources other than software downloads may be available at mirrored sites.

While viewing the web site, a sender may elect to send an e-mail or other communication including the site address of the web page to other users. The sender may initiate this communication, for example, by positioning cursor 502 over selectable send link 508 and clicking. It will be understood by one skilled in the art that other methods for invoking a function, such as sending a communication, are available.

By selecting send link 508, an e-mail or other communication window is opened, such as the window illustrating a sender e-mail 510 in FIG. 5B. In the example, the same sender, Tom Jones is sending the e-mail to the developers group and John Anderson. The browser preferably detects that the resource available at the current site is also available at mirrored sites. In particular, the browser may detect that the resource available at the current site is also available at mirrored sites from mirrored site addresses tagged within the coding of the web site. The browser then embeds the mirrored site addresses within sender e-mail 510 as illustrated at reference numeral 512.

Figure 6A:
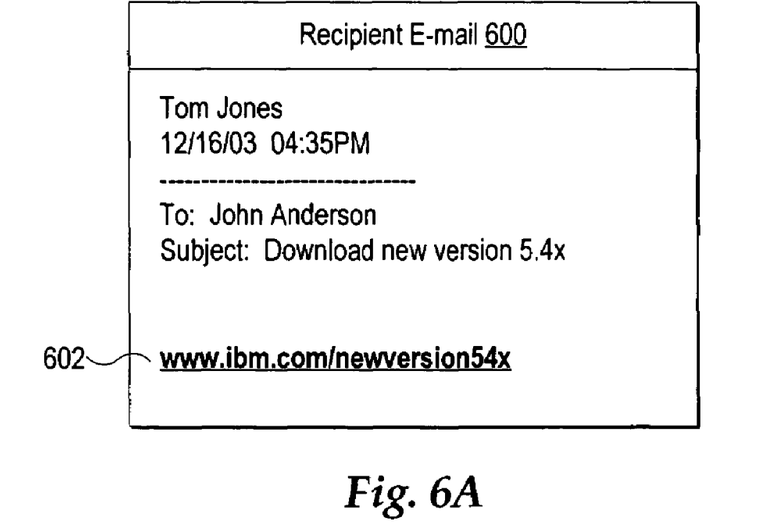
FIGS. 6A and 6B are illustrative examples of received e-mails including embedded mirrored site addresses depicted in accordance with the method, system, and program of the present invention.
Figure 6B:
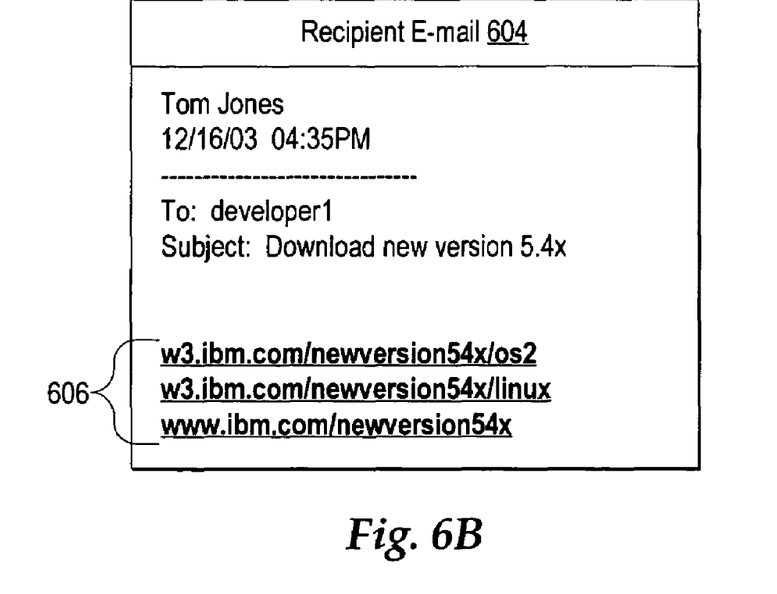

With reference now to FIGS. 6A and 6B, illustrative examples of received e-mails including embedded mirrored site addresses are depicted in accordance with the method, system, and program of the present invention. In the example, a recipient e-mail 600 illustrated in FIG. 6A is received by John Anderson. According to one embodiment of the present invention, the e-mail client detects which mirrored site addresses the recipient has access to and only displays site addresses of accessible sites. The e-mail client may transmit a PING to each site address to determine if the recipient will have access. In this example, after the e-mail client determined the accessible sites, only the site address illustrated at reference numeral 602 is available. In comparison, recipient e-mail 604 in FIG. 6B is received by developer1, who can access the mirrored sites at all three site addresses, as depicted at reference numeral 606. Although not depicted, a specific text attributed is preferably applied to the site addresses depicted at reference numerals 602 and 606 to indicate the site addresses are mirrored sites.

In an alternate embodiment, the e-mail client displays all of the embedded mirrored site addresses with the target site address without filtering. A recipient selects one of the site addresses, which invokes a browser window. The browser then detects the mirrored site addresses within the e-mail and determines which, if any, are accessible to the recipient of the e-mail. The browser may then open communications with all the accessible sites or with a first accessible site. Further, where multiple mirrored sites are accessible to a recipient, the browser may attempt to optimize the accesses by finding the download site with the fastest access speed.

Figure 7:
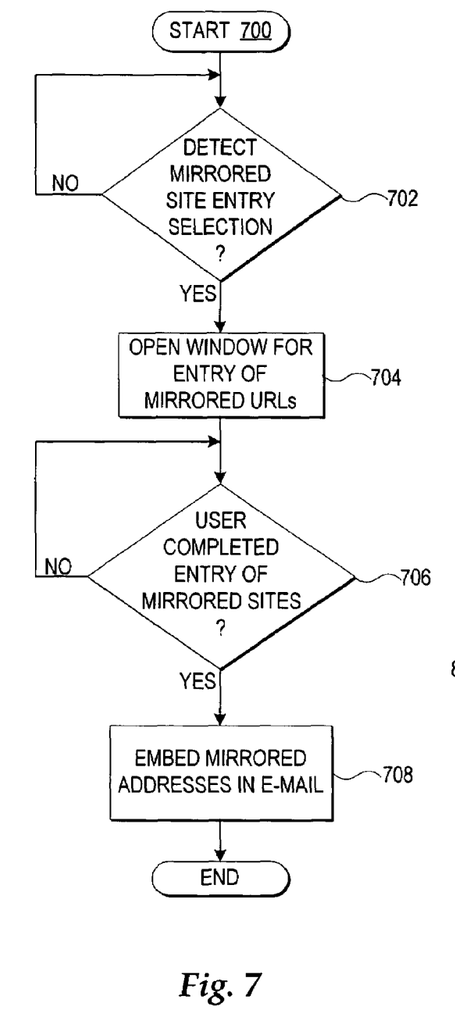
FIG. 7 is a high level logic flowchart depicting a process and program for user entered embedded mirrored site addresses.

Referring now to FIG. 7, there is depicted a high level logic flowchart of a process and program for user entered embedded mirrored site addresses. As illustrated, the process starts at block 700 and thereafter proceeds to block 702. Block 702 depicts a determination as to whether a mirrored site entry selection is made. This selection may be made as illustrated in previous examples where the user right clicks on a target site address to select to add mirrored site addresses. If the selection is not received, the process iterates at block 702. If the selection is received, then the process passes to block 704. Block 704 depicts opening a window for the entry of mirrored site addresses. Alternatively, a user may highlight a site address and then right click on the highlighted site address to designate the site address as a mirrored site address. Next, block 706 illustrates a determination as to whether a user has completed the entry of mirrored sites. If the user has not completed the entry, then the process iterates at block 706. If the user has completed the entry, then the process passes to block 708. Block 708 depicts embedding the mirrored site addresses in the e-mail and the process ends. In an alternate embodiment, the mirrored site addresses are embedded in an alternate type of communication, such as an instant message.

Figure 8:
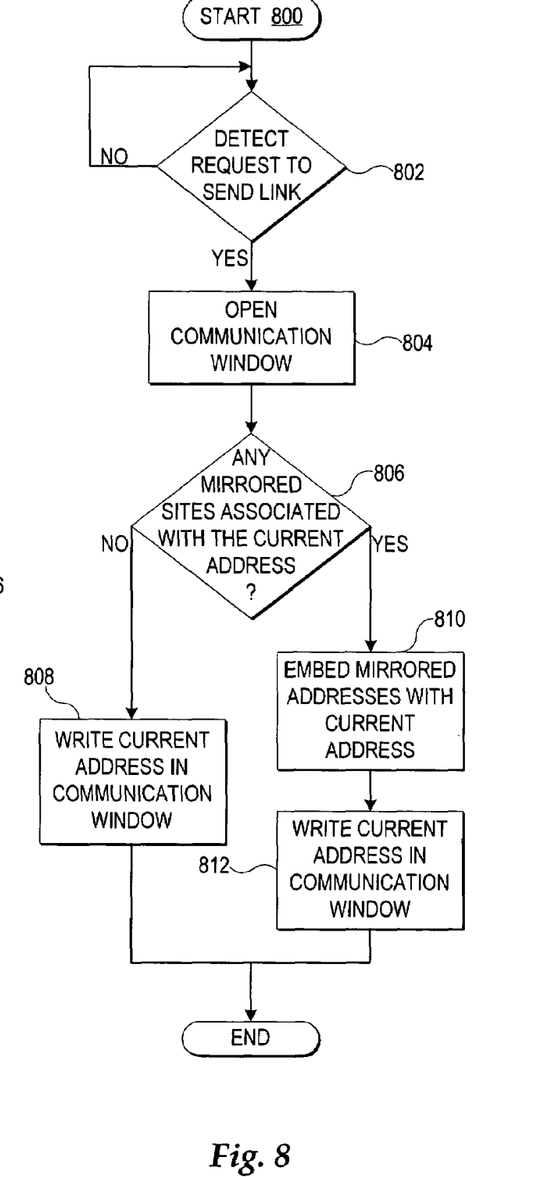
FIG. 8 is a high level logic flowchart illustrating a process and program for sending mirrored site addresses from a browser initiated communication.

With reference now to FIG. 8, there is illustrated a high level logic flowchart of a process and program for sending mirrored site addresses from a browser initiated communication. As depicted, the process starts at block 800 and thereafter proceeds to block 802. Block 802 illustrates a determination as to whether a request to send a link is received. If a request to send a link is not received, then the process iterates at block 802. If a request to send a link is received, then the process passes to block 804. Block 804 illustrates opening a communication window, such as an e-mail client window. Next, block 806 depicts a determination as to whether any mirrored sites are embedded within the coding of the web site accessed from the current site address. Alternatively, the browser may initiate a search for other mirrored sites. If other mirrored sites are not available, then the process passes to block 808. Block 808 depicts writing the current site address as a selectable link in the communication window or copying the current web page into the communication window, and the process ends. If other mirrored sites are available, then the process passes to block 810. Block 810 depicts embedding the mirrored site addresses in association with the current site address and block 812 depicts writing the current URL as a selectable link in the communication window. Then, the process ends. The user may specify the recipients and other data within the communication before the communication is sent.

Figure 9:
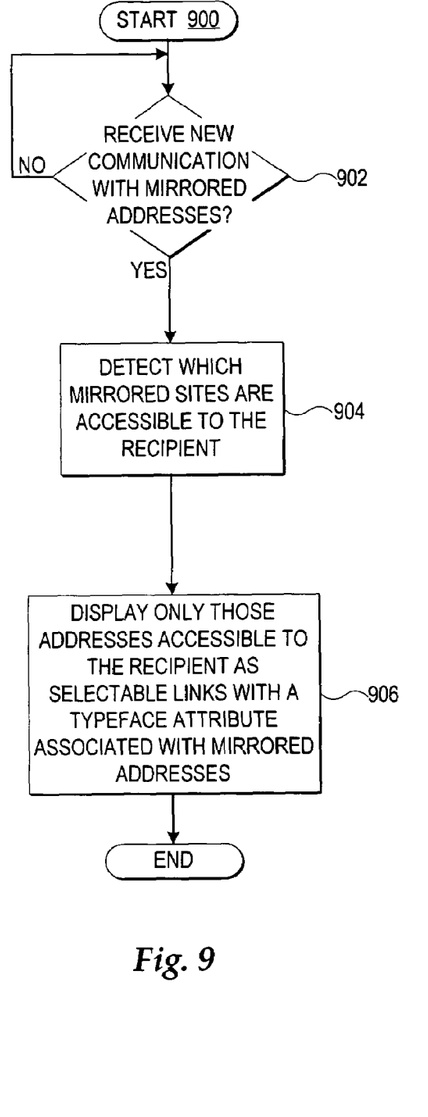
FIG. 9 is a high level logic flowchart depicting a process and program performed by the e-mail client for filtering mirrored site addresses in a received communication according to the network access of the recipient.

Referring now to FIG. 9, there is depicted a high level logic flowchart of a process and program performed by the e-mail client for filtering mirrored site addresses in a received communication according to the network access of the recipient. As illustrated, the process starts at block 900 and thereafter proceeds to block 902. Block 902 depicts a determination of whether a new communication with mirrored site addresses is received. If a new communication with mirrored site addresses is not received, then the process iterates at block 902. If a new communication with mirrored site addresses is received, then the process passes to block 904. Block 904 illustrates detecting which mirrored sites are accessible to the recipient. The e-mail client may detect which mirrored sites are accessible to the recipient by pinging the site addresses or another method of detecting whether access will be available. Next, block 906 depicts displaying only those site addresses for web sites accessible to the recipient as selectable links with a typeface attribute associated with mirrored sites, and the process ends.

Figure 10:
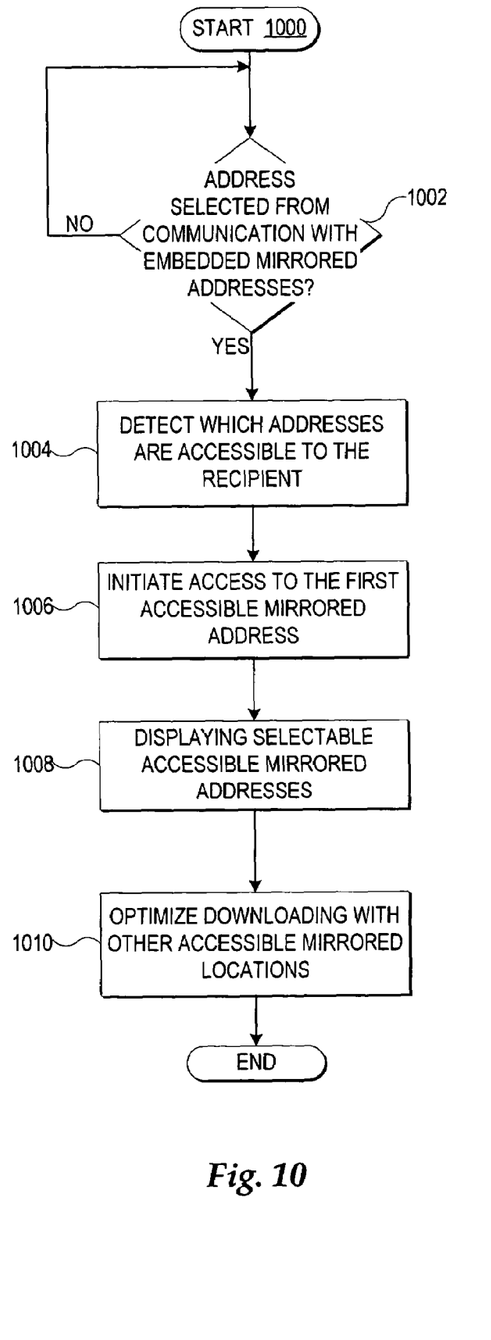
FIG. 10 is a high level logic flowchart illustrating a process and program performed by the browser for filtering mirrored site addresses in a received communication according to the network access of the recipient.

With reference now to FIG. 10, there is illustrated a high level logic flowchart of a process and program performed by the browser for filtering mirrored site addresses in a received communication according to the network access of the recipient. As depicted, the process starts at block 1000 and thereafter proceeds to block 1002. Block 1002 illustrates a determination whether an site address is selected from a communication with embedded mirrored site addresses. If a selection is not received, then the process iterates at block 1002. Once a selection is received, the process passes to block 1004. Block 1004 depicts detecting which site addresses are accessible to the recipient. The browser reads the mirrored site addresses from the communication and detects which site addresses are accessible to the recipient by a PING or other method. Next, block 1006 illustrates initiating access to the first accessible mirrored site address. Alternatively, if the site address selected by the recipient is accessible to the recipient, then access to the selected site address may be initiated first. Thereafter, block 1008 depicts displaying selectable accessible mirrored site addresses. For example, a new window may be opened that lists the selectable accessible mirrored site addresses or the site addresses may be added to a list of selectable site addresses already displayed. Next, block 1010 illustrates optimizing the resource access with the other accessible mirrored locations once a resource is selected. For example, the browser may detect which mirrored locations provide the best download speed and switch between the sites to optimize download time. Then, the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for selectively displaying mirrored site addresses in an electronic mail communication, comprising:

responsive to receiving an electronic mail communication addressed to a particular recipient from among at least one intended recipient at an electronic mail client at a client system communicatively connected to at least one network with a plurality of mirrored site addresses each providing separate access to a same selection of information, transmitting by said electronic mail client a separate signal to each of said plurality of mirrored site addresses to detect whether each of said plurality of mirrored site addresses is accessible to said client system via said at least one network;

detecting a selection of accessible site addresses for said particular recipient from among said plurality of mirrored site addresses from which a separate return signal is received at said client system responsive to said separate signal transmitted to each of said plurality of mirrored site addresses; and displaying only said selection of accessible site addresses in a display of said electronic mail communication to said particular recipient.

2. The method according to claim 1 for selectively displaying mirrored site addresses further comprising:

detecting whether said particular recipient is privileged to access each site address from among said selection of accessible site addresses; and indicating in said display of said electronic mail communication whether said particular recipient is privileged to access each site address from among said selection of accessible site addresses.

3. The method according to claim 1 for selectively displaying mirrored site addresses further comprising:

detecting whether said client system receiving said electronic mail communication is compatible with a resource located at each of said selection of accessible site addresses; and indicating in said display of said electronic mail communication whether said client system is compatible with said resource located at each of said selection of accessible site addresses.

4. The method according to claim 1 for selectively displaying mirrored site addresses wherein detecting a selection of accessible site addresses for said particular recipient further comprises:

detecting said selection of accessible site addresses for said particular recipient in a browser executing on said client system responsive to detecting a request to access a site address from among said plurality of mirrored site addresses.

5. The method according to claim 1 for selectively displaying mirrored site addresses further comprising:

detecting said plurality of mirrored site addresses embedded within said electronic mail communication.

6. A system for selectively displaying mirrored site addresses in a communication, comprising:

a data processing system for accessing at least one network;

said data processing system further comprising:

means, responsive to receiving via said at least one network an electronic mail communication with a plurality of mirrored site addresses each providing separate access to a same selection of information for a particular recipient from among a plurality of intended recipients, for transmitting a separate signal to each of said plurality of mirrored site addresses to detect whether each of said plurality of mirrored site addresses is accessible to said data processing system via said at least one network;

means for detecting a selection of site addresses accessible to said particular recipient from among said plurality of mirrored site addresses from which a separate return signal is received at said data processing system responsive to said separate signal transmitted to each of said plurality of mirrored site addresses; and means for only displaying said selection of accessible site addresses in a display of said electronic mail communication to said particular recipient.

7. The system according to claim 6 for selectively displaying mirrored site addresses further comprising:

means for detecting whether said particular recipient is privileged to access each site address from among said selection of accessible site addresses; and means for indicating in said display of said electronic mail communication whether said particular recipient is privileged to access each site address from among said selection of accessible site addresses.

8. The system according to claim 6 for selectively displaying mirrored site addresses further comprising:

means for detecting whether said data processing system receiving said electronic mail communication is compatible with a resource located at each of said selection of accessible site addresses; and means for indicating in said display of said electronic mail communication whether said data processing system is compatible with said resource located at each of said selection of accessible site addresses.

9. The system according to claim 6 for selectively displaying mirrored site addresses further comprising:

an electronic mail client executing on said data processing system for detecting said selection of accessible site addresses for said particular recipient from said electronic mail communication.

10. The system according to claim 6 for selectively displaying mirrored site addresses further comprising:

a browser executing on said data processing system for detecting said selection of accessible site addresses for said particular recipient responsive to detecting a request to access a site address from among said plurality of mirrored site addresses.

11. The system according to claim 6 for selectively displaying mirrored site addresses further comprising:

means for detecting said plurality of mirrored site addresses embedded within said communication.

12. A computer program product for selectively displaying mirrored site addresses in a communication residing on a volatile or non-volatile computer readable medium comprising instructions which when executed on a computer system cause the computer system to:

responsive to receiving an electronic mail communication addressed to a particular recipient from among at least one intended recipient at an electronic mail client from which said particular recipient accesses said electronic mail communication at a client system communicatively connected to at least one network with a plurality of mirrored site addresses each providing separate access to a same selection of information, transmit by said electronic mail client a separate signal to each of said plurality of mirrored site addresses to detect whether each of said plurality of mirrored site addresses is accessible to said client system via said at least one network;

detect a selection of accessible site addresses for said particular recipient from among said plurality of mirrored site addresses from which a separate return signal is received by said client system responsive to said separate signal transmitted to each of said plurality of mirrored site addresses; and display only said selection of accessible site addresses in a display of said electronic mail communication to said particular recipient.

13. The computer program product according to claim 12 for selectively displaying mirrored site addresses wherein the computer-readable program when executed on a computer further causes the computer to:

detect whether said particular recipient is privileged to access each site address from among said selection of accessible site addresses; and indicate in said display of said electronic mail communication whether said particular recipient is privileged to access each site address from among said selection of site accessible addresses.

14. The computer program product according to claim 12 for selectively displaying mirrored site addresses wherein the computer-readable program when executed on a computer further causes the computer to:

detect whether a client system receiving said electronic mail communication is compatible with a resource located at each of said selection of accessible site addresses; and indicate in said display of said electronic mail communication whether said client system is compatible with said resource located at each of said selection of accessible site addresses.

* * * * *